(12) United States Patent
Jeong et al.

(10) Patent No.: US 7,862,257 B2
(45) Date of Patent: Jan. 4, 2011

(54) CABLE GUIDE DEVICE FOR USE IN A MANHOLE

(75) Inventors: Seong Taek Jeong, Daejeon (KR); Jin Woo Han, Daejeon (KR); Byong Soo Woo, Daejeon (KR)

(73) Assignee: KT Corporation (KR)

( * ) Notice: Subject to any disclaimer, the term of this patent is extended or adjusted under 35 U.S.C. 154(b) by 323 days.

(21) Appl. No.: 11/925,489

(22) Filed: Oct. 26, 2007

(65) Prior Publication Data

US 2008/0101869 A1 May 1, 2008

(30) Foreign Application Priority Data

Oct. 31, 2006 (KR) .................. 10-2006-0106192

(51) Int. Cl.
 *F16L 1/06* (2006.01)
(52) U.S. Cl. ............... 405/184.4; 405/184; 405/154.1; 405/183.5; 242/615.1; 242/615.2; 226/189; 254/389; 254/393
(58) Field of Classification Search ............. 405/184, 405/184.4, 154.1, 183.5; 242/615.1, 615.2, 242/615.4, 157 R, 157.1; 226/189, 196.1; 254/389, 393, 394, 395
See application file for complete search history.

(56) References Cited

U.S. PATENT DOCUMENTS

| | | | | |
|---|---|---|---|---|
| 1,735,301 A | * | 11/1929 | Short | .............. 254/134.3 FT |
| 3,306,581 A | * | 2/1967 | Miller | .............. 254/134.3 FT |
| 6,554,540 B1 | | 4/2003 | Corsan | |

FOREIGN PATENT DOCUMENTS

| | | |
|---|---|---|
| CN | 2083800 U | 8/1991 |
| JP | 61-55415 U | 4/1986 |
| JP | 2-37511 U | 3/1990 |
| JP | 2000-209732 A | 7/2000 |
| JP | 2000-261925 A | 9/2000 |
| KR | 20-0378185 Y1 | 3/2005 |

OTHER PUBLICATIONS

Office Action dated Jun. 17, 2008 of corresponding Japanese Patent Application No. 2007-174415 with its English translation in 5 pages.
Office Action issued on Mar. 13, 2009 of corresponding Chinese Patent Application No. 200710109164.8 with its English translation in 15 pages.

* cited by examiner

*Primary Examiner*—David J Bagnell
*Assistant Examiner*—Sean D Andrish
(74) *Attorney, Agent, or Firm*—Knobbe Martens Olson & Bear LLP

(57) ABSTRACT

A cable guide device for a manhole includes a wall supporting plate supported against a wall surface of an entrance part of the manhole, a cable guide body positioned at the bottom part of the wall supporting plate, a rotation shaft mounted vertically to the cable guide body and the wall supporting plate so that the cable guide body can be rotated from side to side with regard to the wall supporting plate, and at least one guide roller which rotates integrally with a roller shaft combined with the cable guide body so as to guide the cable into at least one underground pipe.

22 Claims, 4 Drawing Sheets

CABLE GUIDE DEVICE FOR USE IN A MANHOLE

CROSS-REFERENCE TO RELATED PATENT APPLICATIONS

This application claims priority to and the benefit of Korean Patent Application No. 10-2006-0106192, filed Oct. 31, 2006, the disclosure of which is incorporated herein by reference in its entirety.

BACKGROUND

1. Field

The present disclosure generally relates to a cable guide device, and more specifically, to a cable guide device for use in a manhole.

2. Discussion of the Related Technology

In general, a cable guide device for a manhole supplies or removes a cable from the ground in an underground pipe through a manhole. A roller has been used as a cable guide device for a manhole.

The roller for a manhole disclosed in Korean Utility Model No. 2004-0034815 is mounted over a manhole support when a cable is installed in an underground pipe through a manhole. The roller comprises a top supporting frame which is positioned at the manhole support and whose inner surface has an open plate shape, a plurality of connection frames extended from the top supporting frame into the inside, a top roller fixing part formed upward from the edge of the connection frame, a top roller rotation shaft formed to connect the top roller fixing part, a top roller that rotates along the top roller rotation shaft, a bottom supporting frame whose inner surface has an open plate shape, a plurality of bottom roller fixing parts extended downward from the inner side of the bottom supporting frame, a bottom roller rotation shaft formed to connect the bottom roller fixing part, a bottom roller that rotates along the bottom roller rotation shaft, an external vertical frame that connects the top supporting frame to the external surface of the bottom supporting frame, and an internal vertical frame that connects the top supporting frame to the inner surface of the bottom supporting frame.

The above-described configuration of the roller can prevent the outer surface of the cable from being damaged by friction of the cable and the support when the cable is installed in the underground pipe through the manhole.

However, the above-discussed roller for a manhole occupies a large installation area in the manhole not to secure a working space. When the direction of the cable is out of the underground pipe, the roller cannot be rotated along the underground pipe. As a result, a large resistance is generated in the roller so that it is difficult to install or remove the cable in the underground pipe from the manhole.

Also, since the above-discussed roller for a manhole has been positioned at the top slab and the bottom of the manhole, a sufficient reaction force cannot be obtained in a place having a large traction power so that it is difficult to install or remove the cable in the underground pipe.

The foregoing discussion is to provide general background information, and does not constitute an admission of prior art.

SUMMARY

One aspect of the invention provides a cable guide device for use in a manhole, which comprises: a fixing member configured to be fixed to a wall defining or neighboring a manhole; at least one roller configured to rotate about a rotational axis thereof and comprising a guide surface, which is configured to contact a cable and guide a movement of the cable; and a swivel mechanism configured to swivel the at least one roller relative to the fixing member about a swivel axis.

In the foregoing device, the at least one roller may comprise a first roller and a second roller, wherein the first roller comprises a first rotational axis and a first guide surface, and wherein the second roller comprises a second rotational axis and a second guide surface. The first and second rotational axes may be substantially parallel. The first and second rollers may be configured to swivel together relative to the fixing member such that the first and second rotational axes remain substantially parallel. The first and second rollers may be configured so as to in combination gently bend the cable within the manhole while guided by the first and second guide surfaces. The first roller may be configured to receive or contact a first portion of the cable, and the second roller may be configured to receive or contact a second portion of the cable, wherein the first portion may be at a first cable distance measured along the cable from a zeroth portion of the cable entering a manhole entrance opening, wherein the second portion may be at a second cable distance measured along the cable from the zeroth portion, and wherein the second cable distance is greater than the first cable distance.

Still in the foregoing device, the at least one roller may further comprise a third roller, which comprises a third guide surface and a third rotational axis, which is substantially parallel to the first rotational axis, wherein the third guide surface may be configured to receive or contact a third portion of the cable, which is at a third cable distance measured along the cable from the zeroth portion, wherein the third cable distance may be greater than the second cable distance. The first, second and third guide surfaces may be aligned so as to in combination gently bend and guide the cable within the manhole. The device of Claim 7, wherein the at least one roller may further comprise a fourth roller, which comprises a fourth guide surface and a fourth rotational axis, which is substantially parallel to the first rotational axis, wherein the fourth guide surface may be capable of receiving or contacting a fourth portion of the cable, which is at a fourth cable distance measured along the cable from the zeroth portion, and wherein the fourth cable distance may be greater than the third cable distance. The first, second, third and fourth rotational axes may respectively comprise first, second, third and fourth distances to a plane perpendicular to the swivel axis, wherein the third distance may be greater than the first, second and fourth distances.

Yet in the foregoing device, the swivel mechanism may be further configured to lock or unlock a swivel movement of the at least one roller, wherein when the swivel mechanism is locked, the swivel mechanism may substantially restrict the swivel movement. The swivel mechanism may further comprise at least one swivel stop configured to limit a swivel movement of the at least one roller to a predetermined angle about the swivel axis. The fixing member may comprise a fixing surface configured to contact the wall and contoured to match a contour of the wall. The guide surface may be contoured so as to substantially fittingly receive the cable.

Another aspect of the invention provides a method of conducting an underground cable work, which comprises: providing a cable guide device comprising at least one roller and a swivel mechanism, wherein the at least one roller comprises a rotational axis and a guide surface, wherein the swivel mechanism comprises a swivel axis; fixing the device to a wall defining or neighboring a manhole such that a surface of the device is attached to the wall, wherein the manhole is provided with an opening of an underground cable pipe; and engaging a cable with the device such that a first portion of the cable is kept within the underground cable pipe, a second portion of the cable is located above the ground, and a third portion of the cable between the first and second portions contacts or is received by the guide surface, wherein engaging the cable comprises swiveling the at least one roller about the swivel axis so as to align the guide surface with the opening of the underground cable pipe.

In the foregoing method, engaging may further comprise, once the guide surface has been aligned with the opening, restricting the swivel mechanism so as to prevent the at least one roller from significant swiveling, which can lead to a misalignment between the guide surface and the opening. The method may further comprise pulling the cable from above the ground so as to bring the first portion out of the underground cable pipe. The method may further comprise: supplying the cable from above the ground so as to make the third portion of the cable get into the underground cable pipe via the opening. The device may further comprise a fixing member configured to be fixed to the wall, wherein the fixing member comprises a fixing surface, which is contoured corresponding to a contour of the wall. The cable may be substantially fittingly received by the guide surface.

Still in the foregoing method, the at least one roller may comprise a first roller and a second roller, wherein the first roller comprises a first rotational axis and a first guide surface, and wherein the second roller comprises a second rotational axis and a second guide surface, wherein the first and second rotational axes may be substantially parallel. When swiveling, the first and second rollers may swivel together relative to the manhole and the first and second rotational axes may remain substantially parallel. When the cable is engaged with the device, the first guide surface may contact a position in the third portion of the cable and the second guide surface may contact another position in the third portion of the cable. The at least one roller may further comprise a third roller, which comprises a third guide surface and a third rotational axis, wherein the at least one roller further may comprise a fourth roller, which comprises a fourth guide surface and a third rotational axis, and wherein the third and fourth rotational axes may be substantially parallel to the first rotational axis. The first, second and third guide surfaces may be aligned so as to in combination gently bend and guide the cable within the manhole. The first, second, third and fourth rotational axes may respectively comprise first, second, third and fourth distances to a plane perpendicular to the swivel axis, wherein the third distance may be greater than the first, second and fourth distances.

Various embodiments of the present invention are directed at providing a cable guide device for a manhole which minimizes the installation area in the manhole to acquire the work space, locates a cable in a desired underground pipe when the cable is installed into or removed from the underground pipe precisely due rotating of itself and obtains a sufficient reaction force in a place that is under a large traction power to improve workability.

According to an embodiment of the present invention, a cable guide device for a manhole comprises: a wall supporting plate supported against a wall surface of an entrance part of the manhole; a cable guide body positioned at the bottom part of the wall supporting plate; a rotation shaft mounted vertically to the cable guide body and the wall supporting plate so that the cable guide body can be rotated from side to side with regard to the wall supporting plate; and at least one guide roller which rotates integrally with a roller shaft combined with the cable guide body so as to guide the cable into at least one underground pipe.

The cable guide body has a stopper for stopping rotation of the cable guide body by engaging with the wall supporting plate when the cable guide body rotates by a predetermined angle.

The stopper comprises a first stopper for stopping left rotation of the cable guide body and a second stopper for stopping right rotation of the cable guide body.

The guide roller comprises a plurality of the guide rollers positioned along the underground pipe from the entrance part of the manhole.

The roller shaft is further incorporated with a roller shaft bearing for facilitating the rotation of the cable guide body and the guide roller.

The wall supporting plate comprises a supporting plate body which has the same shape as that of the wall surface so as to be closely adhered to the wall surface, and a bearing which extends from the bottom end of the supporting plate body and contacts with the cable guide body with which the rotation shaft is to be combined.

The cable guide body is contactably positioned at a lower surface of a top slab where the entrance part of the manhole is formed.

BRIEF DESCRIPTION OF THE DRAWINGS

Other aspects and advantages of the present invention will become apparent upon reading the following detailed description and upon reference to the drawings in which.

DETAILED DESCRIPTION OF EMBODIMENTS

Various aspects and features of the present invention will be described in detail with reference to the accompanying drawings.

Figures 1, 1A:
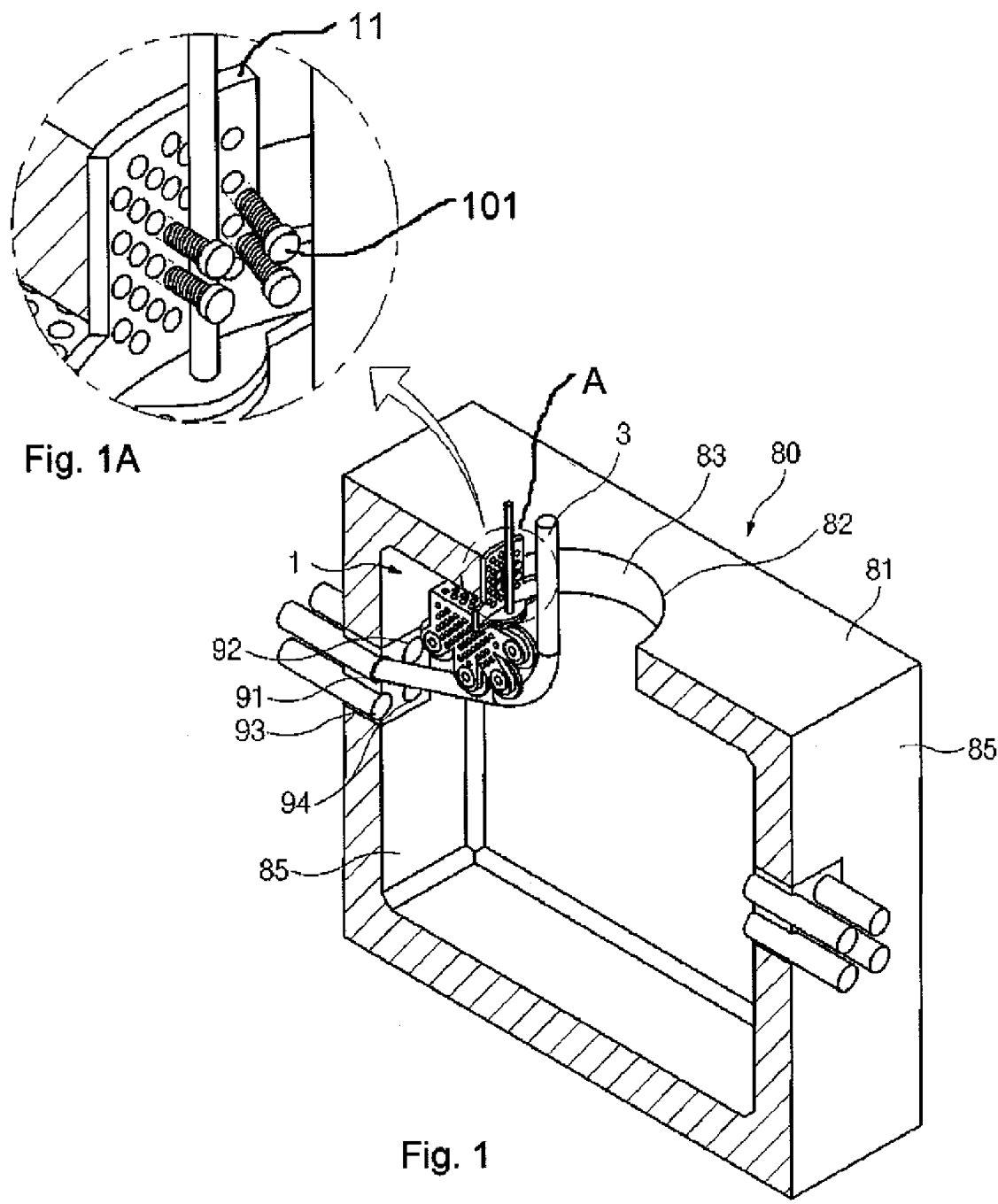
FIG. 1 is a perspective view illustrating a cable guide device mounted in a manhole according to an embodiment of the present invention.
FIG. 1A is an enlarged view of a portion A of FIG. 1.
Figure 2:
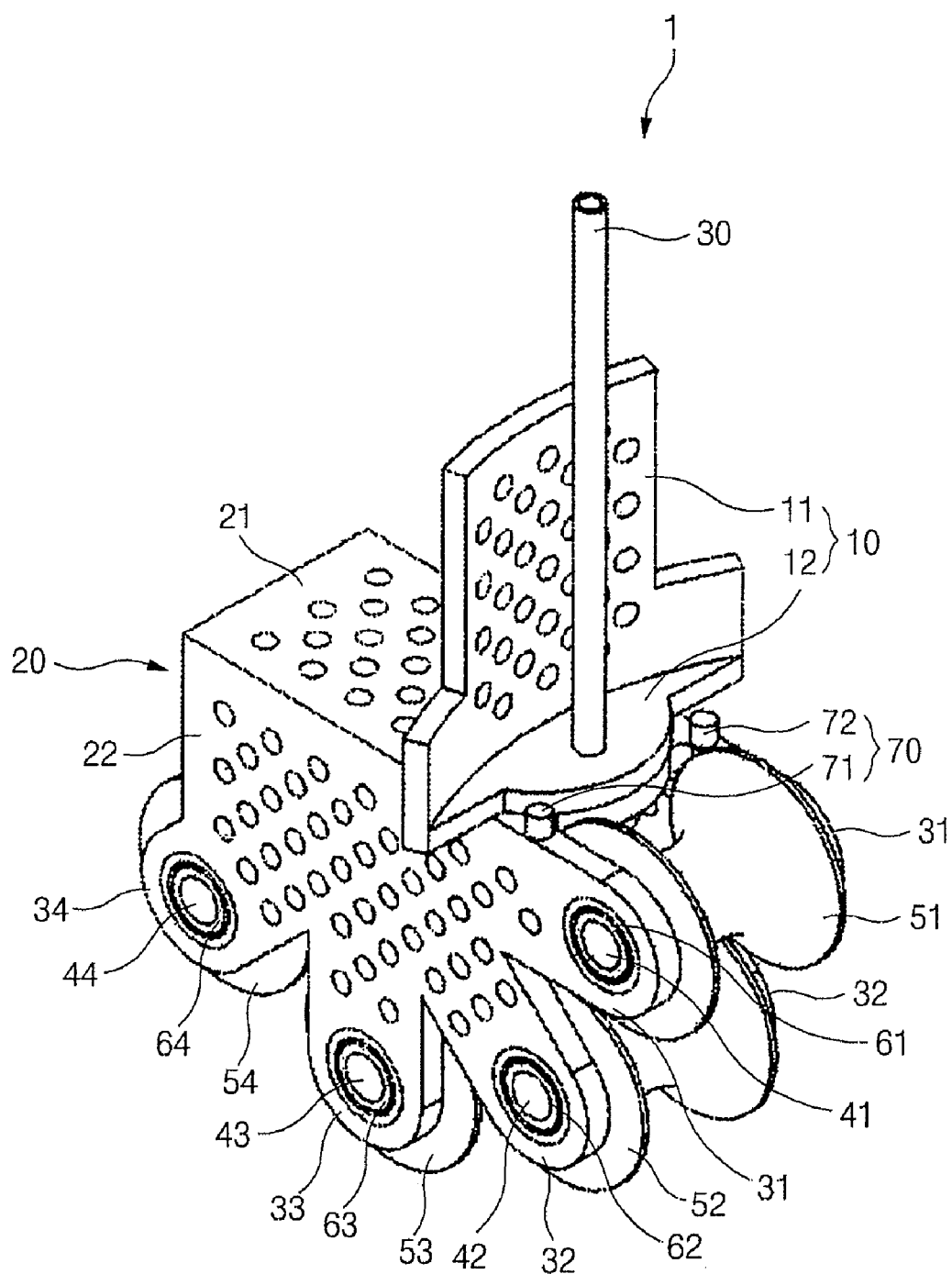
FIG. 2 is a perspective view illustrating the initial state of the cable guide device according to an embodiment of the present invention.

FIG. 1 is a perspective view illustrating a cable guide device mounted in a manhole according to an embodiment of the present invention, and FIG. 2 is a perspective view illustrating the initial state of the cable guide device according to an embodiment of the present invention.

In one embodiment, a cable guide device 1 for a manhole comprises a wall supporting plate 10 supported against a wall surface 83 of an entrance part 82 of the manhole 80, a cable guide body 20 positioned at the bottom part of the wall supporting plate 10, a rotation shaft 30 mounted vertically to the cable guide body 20 and the wall supporting plate 10 so that the cable guide body 20 can be rotated from side to side with regard to the wall supporting plate 10, and at least one guide rollers 51, 52, 53 and 54 which rotates integrally with roller shafts 41, 42, 43 and 44 combined with the cable guide body 20 so as to guide the cable 3 into underground pipes 91, 92, 93 and 94.

The entrance part 82 of the manhole 80 is formed to have a circular shape so that the cable 3 can be installed into or removed from the underground pipes 91, 92, 93 and 94 through the entrance part 82. The entrance part 82 of the manhole 80 is formed to penetrate a top slab 81, and the underground pipes 91, 92, 93 and 94 are formed at a side slab 85.

The wall supporting plate 10 comprises a supporting plate body 11 which has the same shape as that of the wall surface 83 of the entrance part 82 of the manhole 80 so as to be closely adhered to the wall surface 83, and a bearing 12 which extends from the bottom end of the supporting plate body 11 to contact with a top surface 21 of the cable guide body 20 with which the rotation shaft is to be combined.

The supporting plate body 11 is formed to be curved identically with the shape of the wall surface 83, and combined with the wall surface 83 by way of a joint means such as a bolt 101.

The bearing 12 contacts with the top surface 21 of the cable guide body 20 adjacent to the rotation shaft 30, and enables the cable guide body 20 to rotate smoothly by a friction force when the cable guide body 20 rotates from side to side.

The cable guide body 20 comprises the top surface 21 combined with the wall supporting plate 10 by the rotation shaft 30, a front surface 22 and a rear surface (not shown) which respectively extends downward from the front and rear end of the top surface 21, and roller shaft supporting parts 31, 32, 33 and 34 which are integrally formed at the front surface 22 and the rear surface, and into which the roller shafts 41, 42, 43 and 44 are inserted and supported thereby. Although the rear surface and a part of the roller shaft supporting parts of the rear surface are not shown, each of them is substantially the same to the front surface 22 and the roller shaft supporting parts 31, 32, 33 and 34 of the front surface 22.

Figure 3:
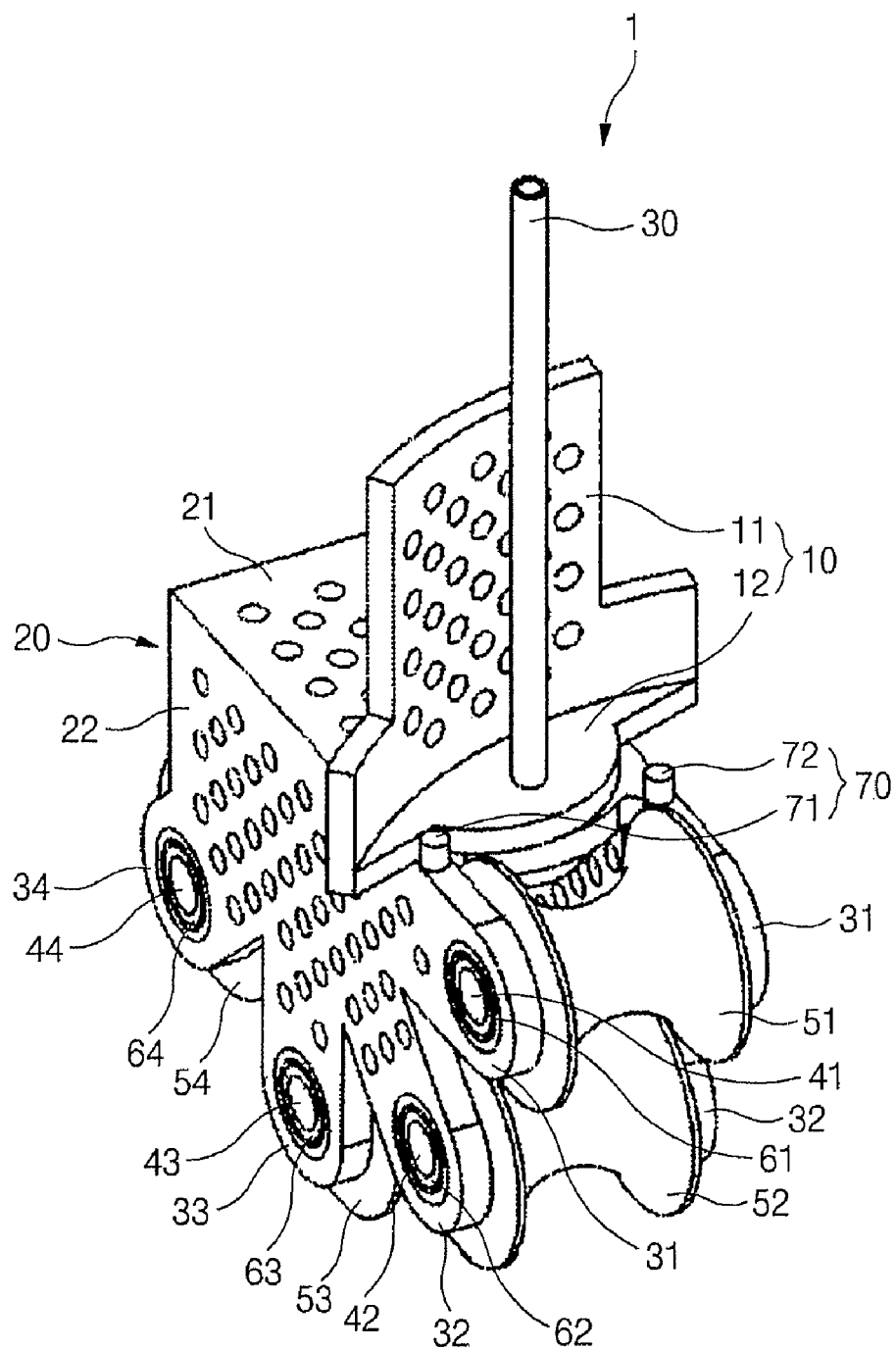
FIG. 3 is a perspective view illustrating the cable guide device of FIG. 2 which is rotated left.
Figure 4:
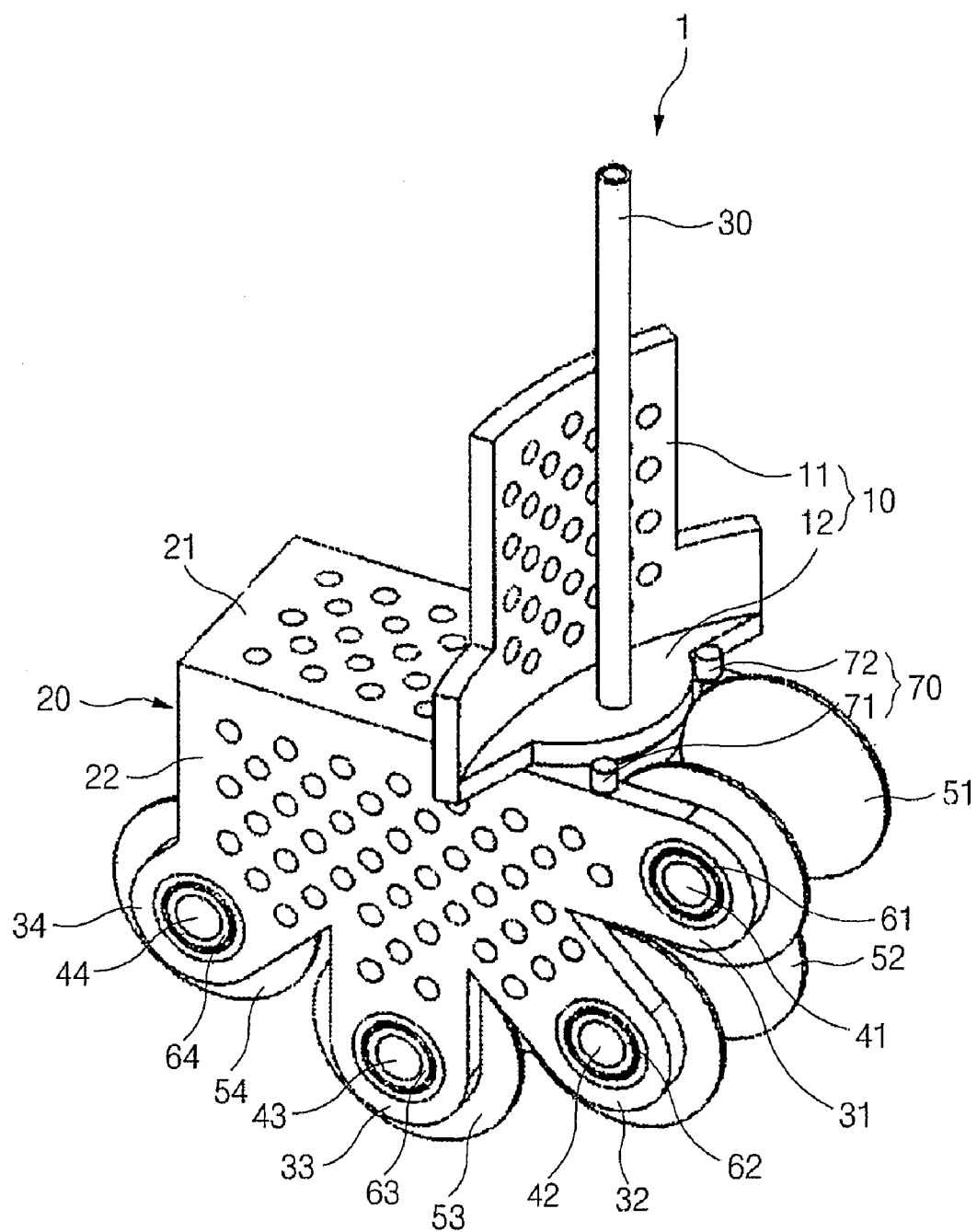
FIG. 4 is a perspective view illustrating the cable guide device of FIG. 2 which is rotated right.

At least one stopper 70 protrudes upward at both sides of the top surface 21 of the cable guide body 20. The stopper 70 preferably comprises a first stopper 71 and a second stopper 72. The first stopper 71 contacts with the wall supporting plate 10 when the cable guide body 20 rotates by a predetermined angle leftward as shown in FIG. 3, thereby holding further rotation of the cable guide body 20. The second stopper 72 contacts with the wall supporting plate 10 when the cable guide body 20 rotates by a predetermined angle rightward as shown in FIG. 4, thereby holding further rotation of the cable guide body 20. As a result, as the stopper 70 prevents the cable guide body 20 from being further unnecessarily, freely rotated after a predetermined rotation from left (right) side to right (left) side centrally with the rotation shaft 30, it is easy to install or remove the cable 3 into/from the underground pipes 91, 92, 93 and 94.

The cable guide body 20 preferably contacts with the lower surface of the top slab 81 of the manhole 80. That is, the cable guide body 20 is positioned not in the entrance part 82 of the manhole 80 but at the bottom part of the top slab 81 so that a working space can be acquired through the entrance part 82. As a result, the work efficiency of the cable guide device 1 can be improved.

The rotation shaft 30 penetrates the bearing 12 of the wall supporting plate 10 and the top surface 21 of the cable guide body 20, being positioned to the Z axis direction so that the cable guide body 20 can be rotated from left (right) side to right (left) side with regard to the wall supporting plate 10.

The guide rollers 51, 52, 53 and 54 are formed each to have a dumbbell shape, and positioned along the underground pipes 91, 92, 93 and 94 from the entrance part 82 of the manhole 80. That is, a plurality of the guide rollers 51, 52, 53 and 54 are positioned in the direction of the underground pipes 91, 92, 93 and 94 so that the cable 3 can be guided toward the underground pipes 91, 92, 93 and 94 more safely when compare with a single guide roller. The roller shafts 41, 42, 43 and 44 are inserted into the roller shaft supporting parts 31, 32, 33 and 34 formed in the cable guide body 20.

Roller shaft bearings 61, 62, 63 and 64 are preferably combined at both end portions of the roller shafts 41, 42, 43, 44 so that the guide rollers 51, 52, 53 and 54 can be rotated smoothly.

Hereinafter, the process for installing or removing the cable 3 into/from the underground pipes 91, 92, 93 and 94 using the cable guide device 1 for a manhole according to an embodiment of the present invention is explained with reference to FIGS. 1 through 4.

In order to mount the cable guide device 1 in the manhole 80, a worker puts the cable guide device 1 into the entrance part 82 of the manhole 80, make the cable guide body 20 contact with the lower surface of the top slab 81, adheres the wall supporting plate 10 to the wall surface 83 of the entrance part 82, and fixes the wall supporting plate 10 and the wall surface 83 with a bolt.

Then, as shown in FIGS. 3 and 4, while rotating the cable guide body 20 from side to side correspondingly to the locations of the underground pipes 91, 92, 93 and 94, the worker guides the cable 3 into the underground pipes 91, 92, 93 and 94 along the guide rollers 51, 52, 53 and 54. In other words, the cable guide body 20 is rotated leftward or rightward correspondingly to the locations (left top, right top, left bottom, and right bottom) of the underground pipes 91, 92, 93 and 94, and then the cable 3 can be installed into or removed from each of the underground pipes 91, 92, 93 and 94.

Although four guide rollers are prepared in the above-described embodiment, the number of guide rollers can be altered. Also, the roller shaft and the roller shaft supporting part can be changed.

Although the cable guide body is rotated manually from side to side in the above-described embodiment, the rotation shaft can be connected to an electric motor so that the cable guide body can be automatically rotated from side to side.

As described above, a cable guide device for a manhole according to an embodiment of the present invention rotates of itself, thereby locating a cable in a desired underground pipe precisely when the cable is installed into or removed from the underground pipe. Meanwhile, a cable guide body is located not in an entrance part of the manhole but in a bottom side of a top slab to acquire a work space through the entrance part, thereby improving the work efficiency. As the cable guide device is supported against the lower surface of the top slab and at the same time against the wall surface of the entrance part, a cable can be installed into and removed from even a place that is under a large traction power (for example, underground pipe road sinking, underground pipe road damaging, or sheer curvature circumstance) by the reaction force of the top slab and the wall surface.

Although embodiments have been shown by way of example in the drawings and described in detail herein, various modifications and changes may be made to the embodiments. However, it should be understood that the scope of invention is not limited to the particular forms disclosed. Rather, the scope of the invention covers all modifications, equivalents, and alternatives falling within the spirit and scope of the invention as defined in the appended claims.

What is claimed is:

1. A cable guide device for use in a manhole, the device comprising:
    a wall support comprising a surface configured to be in contact with a wall defining or neighboring the manhole;
    a roller holder holding at least one roller rotatable about a rotational axis thereof, the at least one roller comprising a guide surface, which is configured to contact a cable and guide a movement of the cable; and a swivel shaft connected to the wall support and the roller holder, and further configured to permit a swivel movement of the roller holder and the at least one roller relative to the wall support about a swivel axis of the swivel shaft, the swivel axis being generally perpendicular to the rotational axis.

2. The device of claim 1, wherein the at least one roller comprises a first roller and a second roller, wherein the first roller comprises a first rotational axis and a first guide surface, and wherein the second roller comprises a second rotational axis and a second guide surface.

3. The device of claim 2, wherein the first and second rotational axes are substantially parallel.

4. The device of claim 3, wherein the first and second rollers are configured to swivel together relative to the wall support such that the first and second rotational axes remain substantially parallel.

5. The device of claim 2, wherein the first and second rollers are configured so as to in combination gently bend the cable within the manhole while guided by the first and second guide surfaces.

6. The device of Claim 2, wherein the at least one roller further comprises a third roller, which comprises a third guide surface and a third rotational axis, which is substantially parallel to the first rotational axis.

7. The device of claim 6, wherein the first, second and third guide surfaces are aligned so as to in combination gently bend and guide the cable within the manhole.

8. The device of claim 6, wherein the at least one roller further comprises a fourth roller, which comprises a fourth guide surface and a fourth rotational axis, which is substantially parallel to the first rotational axis.

9. The device of claim 1, wherein the device further comprises at least one stopper configured to limit the swivel movement of the at least one roller to a predetermined angle about the swivel axis.

10. The device of claim 1, wherein the surface is contoured to match a contour of the wall.

11. The device of claim 1, wherein the guide surface is contoured so as to substantially fittingly receive the cable.

12. A method of conducting an underground cable work, the method comprising:

providing the cable guide device of claim 1;

fixing the wall support to a wall defining or neighboring a manhole, wherein the manhole is provided with an opening of an underground cable pipe; and engaging a cable with the device such that a first portion of the cable is kept within the underground cable pipe, a second portion of the cable is located above the ground, and a third portion of the cable between the first and second portions contacts or is received by the guide surface of the at least one roller, wherein engaging the cable comprises swiveling the at least one roller about the swivel axis of the swivel shaft so as to align the guide surface with the opening of the underground cable pipe.

13. The method of claim 12, wherein engaging further comprises: once the guide surface has been aligned with the opening, restricting the device to prevent the at least one roller from significant swiveling, which can lead to a misalignment between the guide surface and the opening.

14. The method of claim 12, further comprising: pulling the cable from above the ground so as to bring the first portion out of the underground cable pipe.

15. The method of claim 12, further comprising: supplying the cable from above the ground so as to make the third portion of the cable get into the underground cable pipe via the opening.

16. The method of claim 12, wherein the at least one roller comprises a first roller and a second roller, wherein the first roller comprises a first rotational axis and a first guide surface, and wherein the second roller comprises a second rotational axis and a second guide surface, wherein the first and second rotational axes are substantially parallel, wherein when swiveling, the first and second rollers swivel together relative to the manhole and the first and second rotational axes remain substantially parallel.

17. The method of claim 12, wherein the at least one roller comprises a first roller and a second roller, wherein the first roller comprises a first rotational axis and a first guide surface, and wherein the second roller comprises a second rotational axis and a second guide surface, wherein the first and second rotational axes are substantially parallel, wherein when the cable is engaged with the device, the first guide surface contacts a position in the third portion of the cable and the second guide surface contacts another position in the third portion of the cable.

18. A cable guide device for a manhole, the device comprising:

a wall supporting plate supported against a wall surface of an entrance part of the manhole;

a cable guide body positioned at the bottom part of the wall supporting plate and contactably installed at a lower surface of a top slab where the entrance part of the manhole is formed;

a rotation shaft mounted vertically to the cable guide body and the wall supporting plate so that the cable guide body can be freely rotated from side to side with regard to the wall supporting plate;

plural guide rollers positioned along an underground pipe from the entrance part of the manhole, each of which rotates integrally with a roller shaft combined with the cable guide body so as to guide a cable into the underground pipe; and when the cable is guided into the underground pipe, the cable guide body can be rotated from side to side with regard to the wall supporting plate so that the plural guide rollers are corresponded to a location of the underground pipe.

19. The cable guide device according to claim 18, wherein the wall supporting plate comprises a supporting plate body which has the same shape as that of the wall surface so as to be closely adhered to the wall surface.

20. The cable guide device according to claim 19, wherein the wall supporting plate further comprises a bearing which extends from a bottom end of the supporting plate body and contacts with the cable guide body with which the rotation shaft is to be combined.

21. The cable guide device according to claim 19, wherein the cable guide body has a stopper for stopping rotation of the cable guide body by engaging with the wall supporting plate when the cable guide body rotates by a predetermined angle.

22. The cable guide device according to claim 21, wherein the stopper comprises a first stopper for stopping left rotation of the cable guide body and a second stopper for stopping right rotation of the cable guide body.

* * * * *